US011932519B2

(12) United States Patent
Verheyen et al.

(10) Patent No.: US 11,932,519 B2
(45) Date of Patent: Mar. 19, 2024

(54) DYNAMIC MAXIMUM FREQUENCY IN A SLOW-DOWN REGION FOR A MATERIAL HANDLING SYSTEM

(71) Applicant: Magnetek, Inc., Menomonee Falls, WI (US)

(72) Inventors: Kurtis L. Verheyen, Glendale, WI (US); Casey Cummins, Slinger, WI (US)

(73) Assignee: Magnetek, Inc., Menomonee Falls, WI (US)

( * ) Notice: Subject to any disclaimer, the term of this patent is extended or adjusted under 35 U.S.C. 154(b) by 79 days.

(21) Appl. No.: 17/810,881

(22) Filed: Jul. 6, 2022

(65) Prior Publication Data

US 2024/0010474 A1 Jan. 11, 2024

(51) Int. Cl.

*B66C 13/30* (2006.01)
*B66C 13/46* (2006.01)
*B66C 13/48* (2006.01)
*B66C 13/50* (2006.01)

(52) U.S. Cl.

CPC .............. *B66C 13/30* (2013.01); *B66C 13/46* (2013.01); *B66C 13/48* (2013.01); *B66C 13/50* (2013.01)

(58) Field of Classification Search

CPC ......... B66C 13/30; B66C 13/46; B66C 13/48; B66C 13/50

See application file for complete search history.

(56) References Cited

U.S. PATENT DOCUMENTS 3,921,818 A 11/1975 Yamagishi
4,234,059 A 11/1980 Schaad
4,756,432 A 7/1988 Kawashima et al.
5,481,248 A 1/1996 Kruh
6,343,703 B1 2/2002 Fleagle et al.
8,374,420 B2 2/2013 Murakami
8,401,814 B1 3/2013 Kureck
8,736,459 B2 5/2014 Ouellet
9,944,499 B2 4/2018 Schoonmaker et al.

FOREIGN PATENT DOCUMENTS

JP H08-221133 A 8/1996
KR 10-1999-0020683 A 3/1999
KR 10-1999-0032665 A 5/1999
KR 10-2011-0129099 A 12/2011

OTHER PUBLICATIONS

International Search Report and Written Opinion for Application No. PCT/US2023/026710 dated Oct. 17, 2023 (_ pages).

*Primary Examiner* — Jacob M Amick
*Assistant Examiner* — Charles J Brauch
(74) *Attorney, Agent, or Firm* — Boyle Fredrickson, S.C.

(57) ABSTRACT

A motor controller detects the speed at which a driven member is travelling when it enters a slow-down region of a material handling system. Using this speed and a deceleration rate, the motor controller determines a required slow-down distance to reach a desired slow speed. A traverse distance is determined as a difference between the length of the slow-down region the slow-down distance. The traverse distance extends for a first portion of the slow-down region and the slow-down distance extends for the second portion of the slow-down region. While the driven member is located within the traverse distance, the driven member may continue operating at the speed at which it entered the slow down region. When the driven member reaches the slow-down distance, the motor controller begins decelerating the driven member.

20 Claims, 6 Drawing Sheets

DYNAMIC MAXIMUM FREQUENCY IN A SLOW-DOWN REGION FOR A MATERIAL HANDLING SYSTEM

BACKGROUND OF THE INVENTION

The subject matter disclosed herein relates to controlling maximum motor speed in a slow-down region of a material handling system. More specifically, a system and method of dynamically varying the maximum speed of a trolley or bridge approaching the end-of-travel as a function of the current position of the trolley or bridge is disclosed.

Material handling systems are widely used to lift heavy loads. A typical material handling system includes a hoist having at least one motor used to operate a cable or chain drive to raise and lower a hook, a magnet, a grapple, or other load attachment device. In some applications, the material handling system may include a boom along which the hoist moves to position a load at a desired location. The boom may have additional motors mounted to the boom to drive the hoist between each end of the boom. In other applications, the hoist may be mounted on a trolley, which is, in turn, mounted on a bridge. The trolley is configured to travel side-to-side along the bridge, and the bridge is configured to travel along rails to position the hoist at any location between the rails. Motors and drive trains may be mounted to the trolley and to the bridge to provide propulsion for the trolley and bridge.

When a material handling system includes drive trains to propel the hoist along the boom, the trolley along the bridge, or the bridge along the rails, the material handling system typically includes a sensor to detect when the driven motion is reaching an end of travel. When, for example, the trolley nears one side of the bridge or the bridge nears one end of the rails, it is desirable to slow the motion of the trolley or bridge prior to reaching the end of travel. A limit switch or other such device may be located along the length of travel. When the limit switch detects the presence of the driven member, it generates a feedback signal provided to a motor drive controlling the motor for the driven member. When the motor drive receives the signal from the limit switch, the speed of travel for the driven member is reduced to a slow speed, preventing the driven member from approaching the end of travel at too great a speed.

Using a limit switch or other such device to slow down a driven member as it approaches an end-of-travel is not without certain drawbacks. The location of the switch must be selected such that a trolley or bridge, travelling at its maximum speed, has sufficient time to decelerate prior to reaching the end-of-travel. If, however, the trolley or bridge is travelling at a speed less than its maximum speed, it will still begin deceleration when it reaches the limit switch. After decelerating to a slower speed, the driven member can still travel to the end of travel. However, the driven member will travel at a reduced speed for at least a portion of the distance. If, for example, the bridge or trolley is travelling at one-half of the maximum speed when it reaches the limit switch, it will decelerate to the slow speed in half the time required to decelerate from maximum speed. Therefore, the bridge or trolley will move at the slow speed after deceleration is complete throughout the remaining distance to the end of travel.

Thus, it would be desirable to provide an improved system and method for controlling speed of a driven member for a material handling system while that driven member is located within a slow-down operating region.

BRIEF DESCRIPTION OF THE INVENTION

The subject matter disclosed herein describes an improved system and method for controlling speed of a driven member for a material handling system while that driven member is located within a slow-down operating region. A first sensor is provided at the start of a slow-down region, such that a bridge or trolley entering the slow-down region is detected by the first sensor. A second sensor is provided at the end of the slow-down region, where the second sensor defines an end-of-travel. When the second sensor detects the bridge or trolley reaching the end-of-travel, the sensor generates a signal to the motor controller to bring the bridge or trolley to a stop. Sufficient distance is provided along the bridge or rail after the end-of-travel sensor to allow the trolley or bridge, respectively, to come to a controlled stop before hitting a mechanical limit. The region along the bridge or trolley between the first sensor and the second sensor is referred to herein as the slow-down region. Within the slow-down region, the motor controller is configured to reduce the speed of the bridge or trolley to a slow speed, such that little additional stopping distance is required beyond the end-of-travel sensor.

The system and method disclosed herein for controlling speed of the driven member for the material handling system while that driven member is located within the slow-down operating region varies the point within the slow-down region at which the motor controller begins to decelerate the driven member such that the driven member does not end up travelling for long distances at the slow speed. Alternately, the system and method can be considered as providing for a dynamic maximum speed within the slow-down region. Initially, the motor controller detects the feedback signal generated by the first sensor to indicate a driven member, such as a bridge or trolley, entering the slow down region. The motor controller detects the speed at which the driven member is travelling when it enters the slow-down region. Using the speed at which the driven member is travelling and a deceleration rate at which the motor controller is configured to slow down the driven member, the motor controller determines a required slow-down distance. The slow-down distance is the distance required to decelerate from the speed at which the driven member enters the slow-down region to the slow speed at which it should be traveling before reaching the end-of-travel sensor. A difference between the total length of the slow-down region and this slow-down distance is referred to herein as a traverse distance. The traverse distance extends for a first portion of the slow-down region and the slow-down distance extends for the second portion of the slow-down region. While the driven member is located within the traverse distance, the driven member may continue operating at the speed at which it entered the slow down region. When the driven member reaches the slow-down distance, the motor controller begins decelerating the driven member. Thus, the bridge or trolley is able to continue travelling at a faster speed within the slow-down region for at least a portion of the length of the slow-down region. Deceleration of the driven member will still begin at a point at which the driven member is able to reach slow speed prior to encountering the end-of-travel sensor.

According to one embodiment of the invention, a system for dynamically controlling operation in a slow-down region for a material handling system includes at least one motor operatively connected to the material handling system to drive motion of an axis of motion for the material handling system, at least one motor controller operatively connected to control operation of the at least one motor, and a sensor configured to generate a feedback signal corresponding to a start of the slow-down region along the axis of motion. The slow-down region has a first length, and the feedback signal is provided to the at least one motor controller. The at least one motor controller is operative to determine a present velocity of the axis of motion, determine a slow-down distance for the axis of motion as a function of the present velocity and a deceleration rate, determine a traverse distance for the axis of motion as a difference between the first length and the slow-down distance, keep the present velocity of the axis of motion at a commanded velocity when the axis of motion is within the traverse distance, and decelerate the axis of motion when the axis of motion enters the slow-down distance.

According to one aspect of the invention, the at least one motor controller is further operative to determine the present velocity and the slow-down distance for the axis of motion when the feedback signal is generated by the sensor.

According to another aspect of the invention, the at least one motor controller is further operative to track a current position of the axis of motion, and to periodically determine the present velocity, the slow-down distance, and the traverse distance while the current position of the axis of motion is within the slow-down region. The at least one motor controller may also periodically determine a maximum speed for the axis of motion as a function of the current position and the deceleration rate while the axis of motion is in the slow-down region, keep the present velocity of the axis of motion at the commanded velocity when the present velocity of the axis of motion is less than the maximum speed, and decelerate the axis of motion when the present velocity of the axis of motion is equal to or greater than the maximum speed.

According to still other aspects of the invention, the at least one motor controller is further operative to detect a direction of travel for the axis of motion, decelerate the axis of motion when the axis of motion is travelling toward an end-of-travel and the axis of motion enters the slow-down distance, and permit the axis of motion to travel up to a maximum speed when the axis of motion is travelling away from the end-of-travel and the axis of motion is in the slow-down distance. Optionally, the at least one motor controller may monitor a motor command to determine a number of revolutions of the motor, determine a present location of the axis of motion as a function of the number of revolutions of the motor, and determine whether the axis of motion is within the traverse distance or the slow-down distance as a function of the present location.

According to yet another aspect of the invention, the system may include a position feedback device configured to generate a position feedback signal, corresponding to an angular position of the at least one motor. The at least one motor controller may determine a present location of the axis of motion as a function of the position feedback signal and determine whether the axis of motion is within the traverse distance or the slow-down distance as a function of the present location.

According to another embodiment of the invention, a method for dynamically controlling operation in a slow-down region for a material handling system receives a feedback signal from a sensor at a motor controller. The feedback signal corresponds to a start of the slow-down region, and the motor controller is operatively connected to control operation of a motor for an axis of motion in the material handling system. A present velocity of the axis of motion is determined with the motor controller, and a slow-down distance for the axis of motion is also determined as a function of the present velocity and a deceleration rate. A traverse distance for the axis of motion is determined with the motor controller as a difference between a length of the slow-down region and the slow-down distance. The motor controller maintains the commanded velocity for the axis of motion when the axis of motion is within the traverse distance and decelerates the axis of motion when the axis of motion enters the slow-down distance.

According to still another embodiment of the invention, a method for dynamically controlling operation in a slow-down region for a material handling system determines a distance of a bridge or a trolley to travel between a slow-down sensor and a desired position for a slow-down speed. A feedback signal is received from the slow-down sensor at a motor controller for the bridge or trolley, and a slow-down distance is determined for the bridge or trolley to reach the desired position for the slow-down speed after receiving the feedback signal from the slow-down sensor. Motion of the bridge or trolley is continued without decelerating for at least a portion of the distance between the slow-down sensor and the desired position for the slow-down speed, and the bridge or trolley is decelerated with the motor controller when the bridge or trolley enters the slow-down distance.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
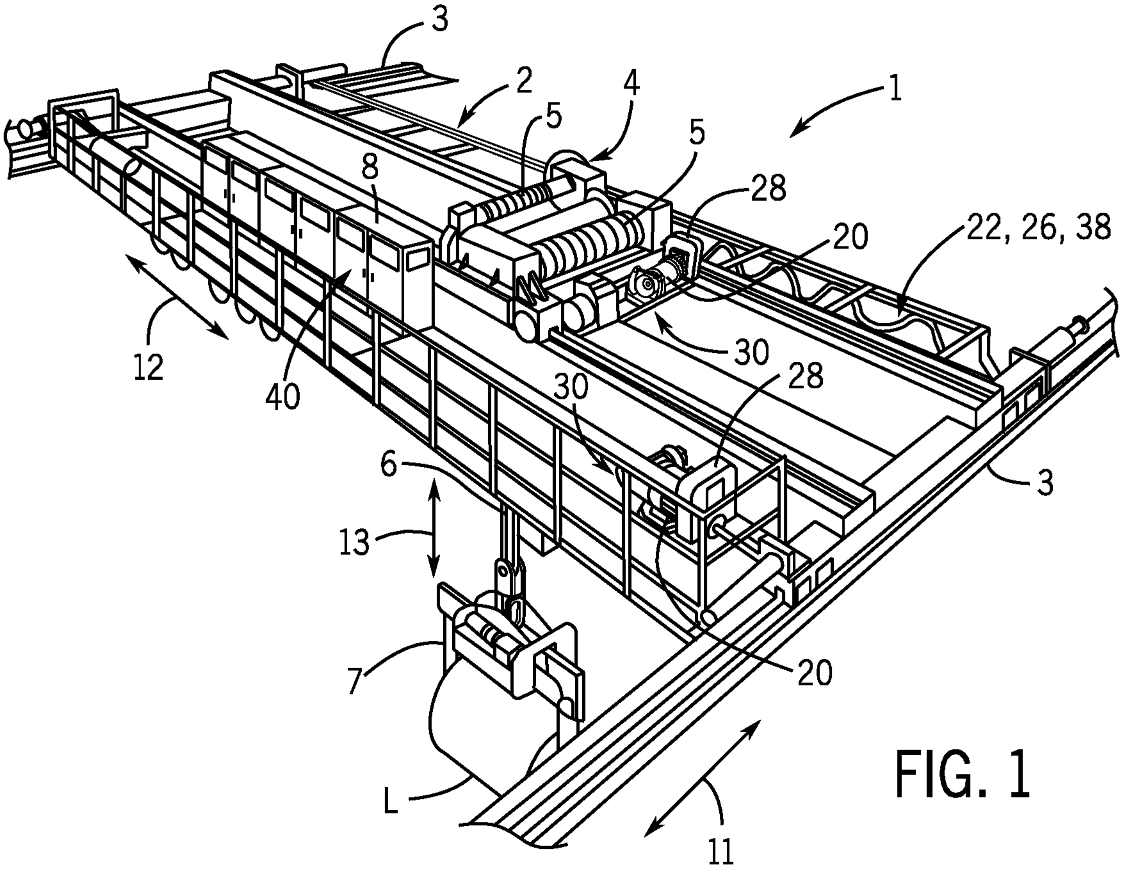
FIG. 1 is an exemplary environment incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE INVENTION

The various features and advantageous details of the subject matter disclosed herein are explained more fully with reference to the non-limiting embodiments described in detail in the following description.

Turning initially to FIG. 1, an exemplary embodiment of a material handling system 1 incorporating the present invention is illustrated. It is contemplated that the material handling system 1 may have numerous configurations according to the application requirements. According to one embodiment, the material handling system 1 may include a bridge 2 configured to move in a first axis of motion 11 along a pair of rails 3 located at either end of the bridge 2. A trolley 4 may be mounted on the bridge 2 to move in a second axis of motion 12, generally perpendicular to the first axis of motion 11, along the length of the bridge 2. One or more sheaves 5, also referred to as drums, may be mounted to the trolley 4, around which a cable 6 is wound. The sheave 5 may be rotated in either direction to wind or unwind the cable 6 around the sheave 5. The cable 6 is operatively connected to a hook block or any other lifting fixture 7 such that the hook block may be connected to a load, L, and move in a third axis of motion 13, generally perpendicular to each of the first and the second axes of motions, 11 and 12. One or more control cabinets 8 housing, control devices such as a motor controller 40 (see FIG. 2) are mounted on the bridge 2.

Figure 2:
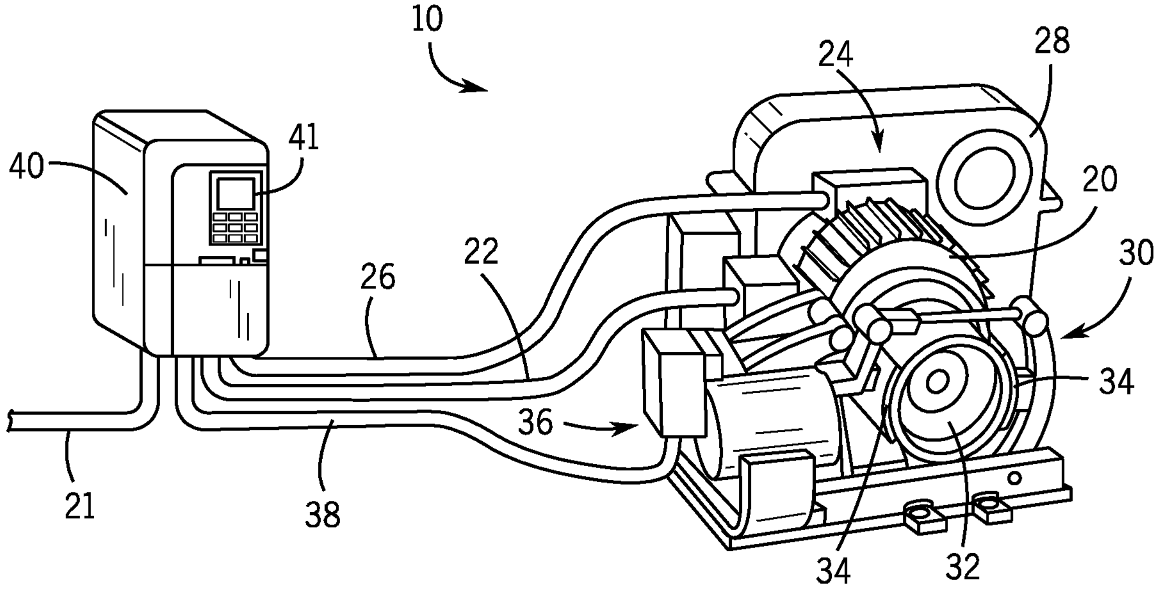
FIG. 2 is a partial perspective view of elements of the drive train for one axis of motion in the exemplary environment of FIG. 1.

Referring next to FIG. 2, an exemplary portion of the drive system 10 for one axis of motion in the material handling system 1 is illustrated. The exemplary portion of the drive system 10 includes a motor 20 controlled by the motor controller 40, also referred to herein as a motor drive. The motor controller 40 delivers a regulated voltage and/or current to the motor 20 via a set of electrical conductors 22. The magnitude and/or frequency of the voltage or current may be varied to control the speed at which the motor 20 rotates, the torque produced by the motor 20, or a combination thereof. A feedback device 24, such as an encoder or a resolver, is connected to the motor, typically by mounting the feedback device 24 to the output shaft at one end of the motor 20. The feedback device 24 provides to the motor controller 40, via electrical conductors 26, any suitable electrical signal, corresponding to rotation of the motor 20, as would be known in the art. A gearbox 28 may be connected to the output shaft of the motor 20 for rotating any suitable drive member at a desired speed according to the requirements of the axis of motion to which the gearbox 28 is connected. Optionally, the motor 20 may be configured to directly rotate the drive member.

A braking unit 30 is supplied to prevent undesired rotation of the motor 20. As illustrated in FIG. 2, one embodiment of the braking unit 30 includes a brake wheel 32 mounted to a shaft extending from the motor 20. Brake shoes 34 engage opposite sides of the brake wheel 32. A brake controller 36 selectively engages and disengages the brake shoes 34 to the brake wheel 32. The brake controller 36 may be, but is not limited to, an electric or a hydraulic controller receiving a command signal from the motor controller 40 via an electrical conductor 38. Optionally, the braking unit 30 may include, for example, a disc attached to the motor and may employ brake pads to engage the disc. It is contemplated that numerous other configurations of brakes may be employed without deviating from the scope of the present invention. According to still other embodiments, the braking unit 30 may be connected at any suitable location along the drive system 10 to prevent motion of the commanded axis according to application requirements.

The following definitions will be used to describe exemplary material handling systems throughout this specification. As used herein, the terms "raise" and "lower" are intended to denote the operations of letting out or reeling in a cable 6 connectable to a load handling member 7 of a material handling system 1 and are not limited to moving a load, L, in a vertical plane. The load handling member 7 may be any suitable device for connecting to or grabbing a load, including, but not limited to, a hook block, a bucket, a clam-shell, a grapple, or a magnet. While an overhead crane may lift a load vertically, a winch may pull a load from the side. Further, an appropriately configured load handling member 7 may allow a load to unwind cable or may reel in the load by winding up the cable at any desired angle between a horizontal plane and a vertical plane.

The "cable," also known as a "rope," may be of any suitable material. For example, the "cable" may be made from, but is not limited to, steel, nylon, plastic, other metal or synthetic materials, or a combination thereof, and may be in the form of a solid or stranded cable, chain links, or any other combination as is known in the art.

A "run" is one cycle of operation of the motor controller 40. The motor controller 40 controls operation of the motor 20, rotating the motor 20 to cause the cable 6 to wind around or unwind from the sheave 5. A "run" may include multiple starts and stops of the motor 20 and, similarly it may require multiple "runs" to let the cable 6 fully unwind or wind completely around the sheave 5 or require multiple "runs" for a bridge or trolley to traverse their full length of travel. Further, the cable 6 need not be fully unwound from or wound around the sheave 5 and a bridge or trolley need not travel to end-of-travel limit before reversing direction of rotation of the motor 20. In addition, direction of rotation of the motor 20 may be reversed within a single run. A "run" may include a temporary pause at zero speed before resuming rotation of the motor. Each "run" begins and ends with the motor controller 40 enabling and disabling control of the motor 20 by the motor controller.

Figure 3:
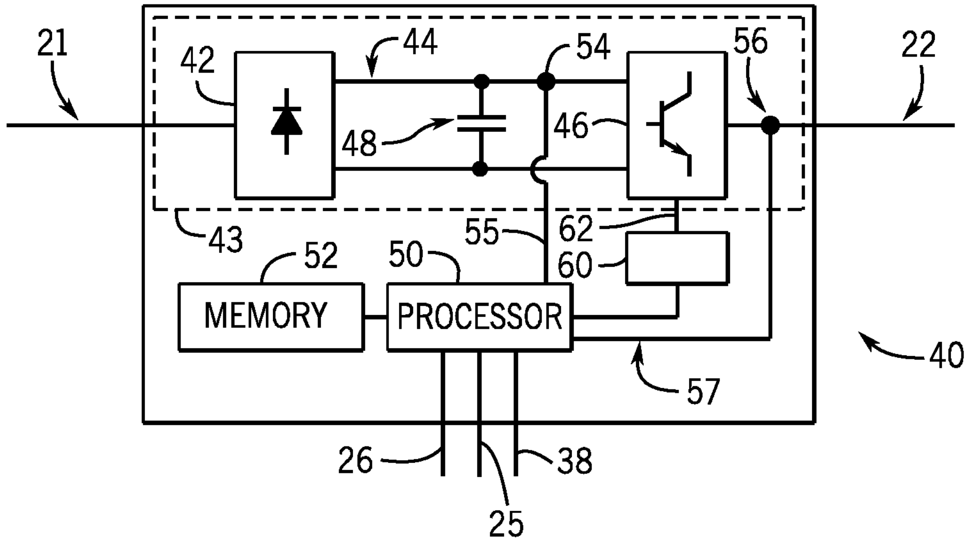
FIG. 3 is a block diagram of a motor controller shown in FIG. 2.

Referring next to FIG. 3, the motor controller 40 receives a command signal 25 from any suitable operator interface. The operator interface may be, but is not limited to, a keypad 41 mounted on the motor controller 40, a remote industrial joystick with a wired connection to the motor controller 40, or a radio receiver connected to the motor controller receiving a wireless signal from a corresponding radio transmitter. The motor controller 40 includes an input 21, for example, one or more terminals, configured to receive power, which may be a single or multiple phase alternating current (AC) or a direct current (DC) power source. A power conversion section 43 of the motor controller 40 converts the input power 21 to a desired power at an output 22 configured to connect to the motor 20. The output 22 may similarly be a single or multiple phase AC or a DC output, according to the application requirements. According to the illustrated embodiment, the power conversion section 43 includes a rectifier section 42 and an inverter section 46, converting a fixed AC input to a variable amplitude and variable frequency AC output. Optionally, other configurations of the power conversion section 43 may be included according to the application requirements. The rectifier section 42 is electrically connected to the power input 21. The rectifier section 42 may be either passive, such as a diode bridge, or active, including controlled power electronic devices such as transistors. The input power 21 is converted to a DC voltage present on a DC bus 44. The DC bus 44 includes a bus capacitance 48 connected across the DC bus 44 to smooth the level of the DC voltage present on the DC bus 44. As is known in the art, the bus capacitance 48 may include a single or multiple capacitors arranged in serial, parallel, or a combination thereof according to the power ratings of the motor controller 40. An inverter section 46 converts the DC voltage on the DC bus 44 to the desired output power for the motor 20 according to switching signals 62.

Figure 4:
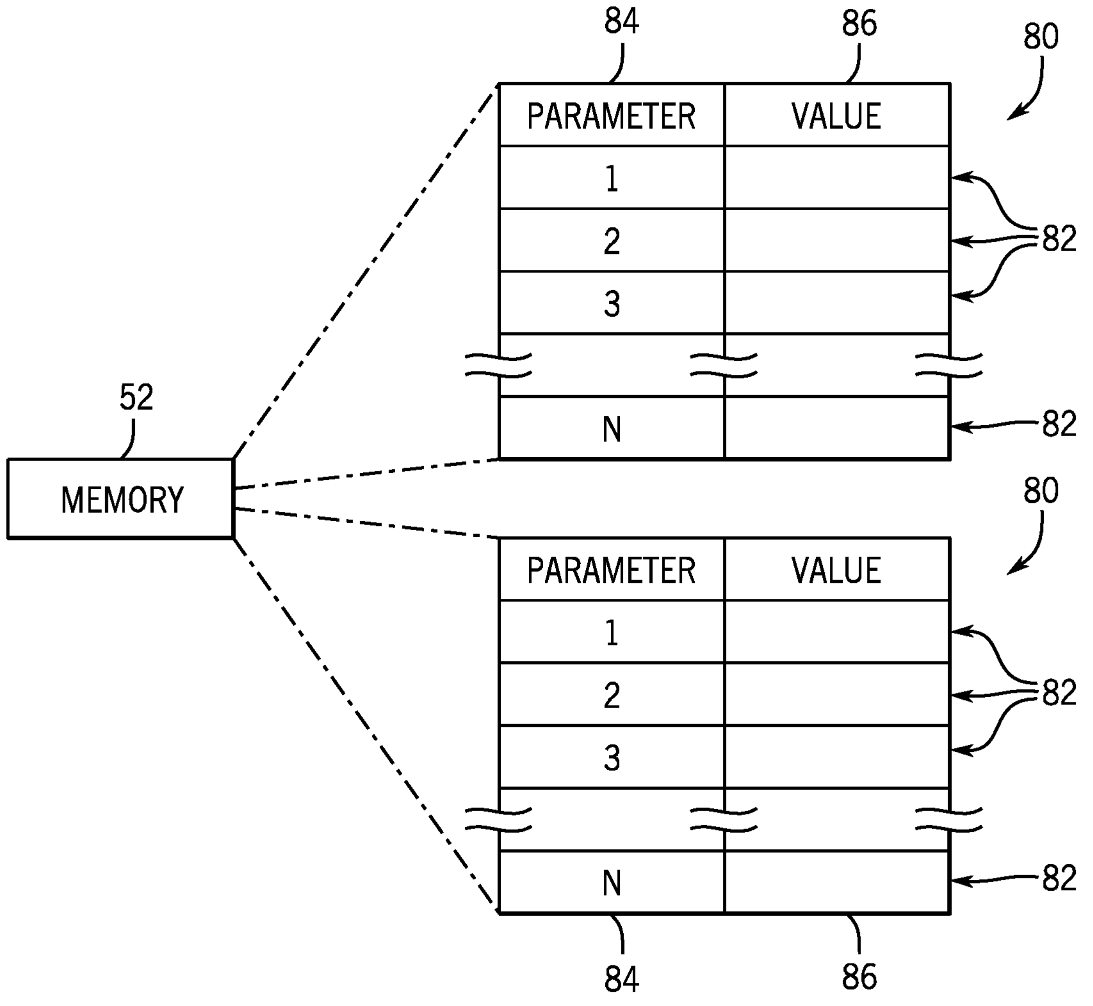
FIG. 4 is a block diagram representation of a portion of the data stored in the memory device of the motor controller of FIG. 3.

The motor controller 40 further includes a processor 50 connected to a memory device 52. It is contemplated that the processor 50 may be a single processor or multiple processors operating in tandem. It is further contemplated that the processor 50 may be implemented in part or in whole on a field programmable gate array (FPGA), an application specific integrated circuit (ASIC), a logic circuit, or a combination thereof. The memory device 52 may be a single or multiple electronic devices, including static memory, dynamic memory, or a combination thereof. The memory device 52 preferably stores parameters 82 of the motor controller 40 and one or more programs, which include instructions executable on the processor 50. Referring also to FIG. 4, a parameter table 80 includes an identifier 84 and a value 86 for each of the parameters 82. The parameters 82 may, for example, configure operation of the motor controller 40 or store data for later use by the motor controller 40.

Figure 5:
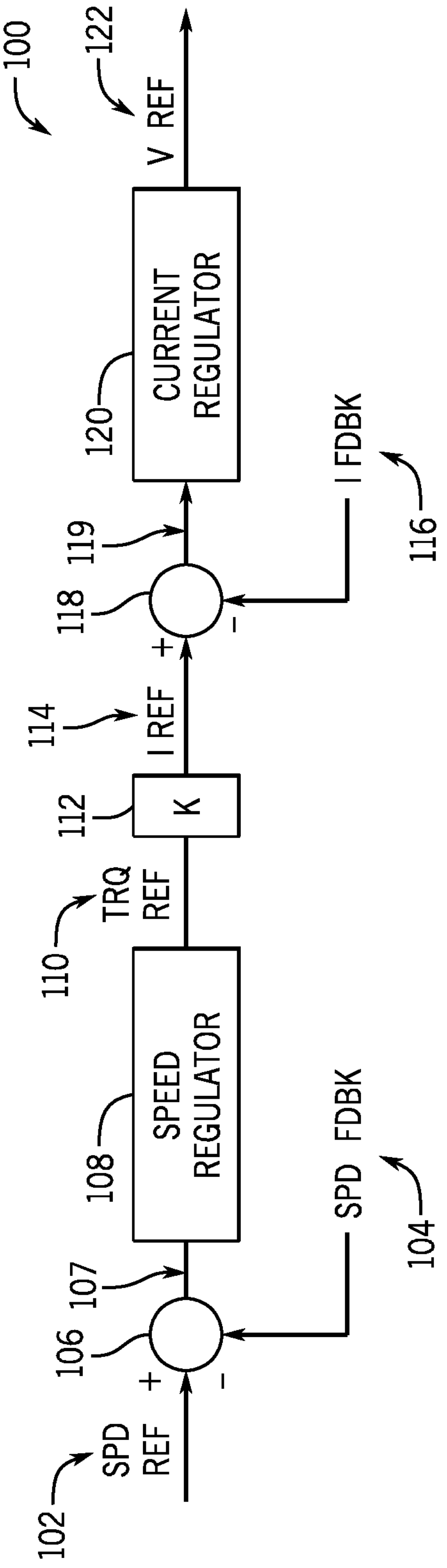
FIG. 5 is a block diagram representation of a motor control module executing in the processor of FIG. 3.

Referring also to FIG. 5, the processor 50 is configured to execute a motor control module 100 to generate a voltage reference 122 to the motor 20 corresponding to the necessary amplitude and frequency to run the motor 20 at the desired speed reference 102. The motor 20 may include a position sensor 24 connected to the motor controller 40 via an electrical connection 26 to provide a position feedback signal corresponding to the angular position of the motor 20. The processor 50 determines a speed feedback signal 104 as a function of the rate of change of the position feedback signal over time. The processor 50 receives feedback signals, 55 and 57, from sensors, 54 and 56 respectively. The sensors, 54 and 56, may include one or more sensors generating signals, 55 and 57, corresponding to the amplitude of voltage and/or current present at the DC bus 44 or at the output 22 of the motor controller 40, respectively. The switching signals 62 may be determined by an application specific integrated circuit 60 receiving reference signals from a processor 50 or, optionally, directly by the processor 50 executing the stored instructions. The switching signals 62 are generated, for example, as a function of the feedback signals, 55 and 57, received at the processor 50.

In operation, the processor 50 receives a command signal 25 indicating a desired operation of one or more of the motors 20 in the material handling system 1 and provides a variable amplitude and frequency voltage output 22 to the motor 20 responsive to the command signal 25. The command signal 25 is received by the processor 50 and converted, for example, from discrete digital signals or an analog signal to an appropriately scaled speed reference 102 for use by the motor control module 100. If closed loop operation of the motor drive 40 is desired, where closed loop operation includes a speed feedback signal 104, the speed reference 102 and the speed feedback signal 104 enter a summing junction 106, resulting in a speed error signal 107. The speed feedback signal 104 may be derived from a position feedback signal generated by the position sensor 24. Optionally, the speed feedback signal 104 may be derived from an internally determined position signal generated, for example, by a position observer. The speed error signal 107 is provided as an input to a speed regulator 108. The speed regulator 108, in turn, determines the required torque reference 110 to minimize the speed error signal 107, thereby causing the motor 20 to run at the desired speed reference 102. If open loop operation of the motor drive 40 is desired, where open loop operation does not include a speed feedback signal, the speed reference signal 102 may be scaled directly to a torque reference 110 that would result in the motor 20 operating at the desired speed reference 102. A scaling factor 112 converts the torque reference 110 to a desired current reference 114. The current reference 114 and a current feedback signal 116, derived from a feedback signal 57 measuring the current present at the output 22 of the motor drive 40, enter a second summing junction 118, resulting in a current error signal 119. The current error signal is provided as an input to the current regulator 120. The current regulator 120 generates the voltage reference 122 which will minimize the error signal 119, again causing the motor 20 to run at the desired speed reference 102. This voltage reference 122 is used to generate the switching signals 62 which control the inverter section 46 to produce a variable amplitude and frequency output voltage 22 to the motor 20.

The command signal 25 may be provided by any suitable operator interface. As previously discussed, the operator interface may be, but is not limited to, a keypad 41 mounted on the motor controller 40, a remote industrial joystick with a wired connection to the motor controller 40, or a radio receiver connected to the motor controller receiving a wireless signal from a corresponding radio transmitter. The command signal 25 may include a position command or a velocity command. The command signal 25 may command either a bridge 2 or trolley 4 to travel in a single axis of motion or command both the bridge 2 and trolley 4 to travel in multiple axes of motions.

Figure 6:
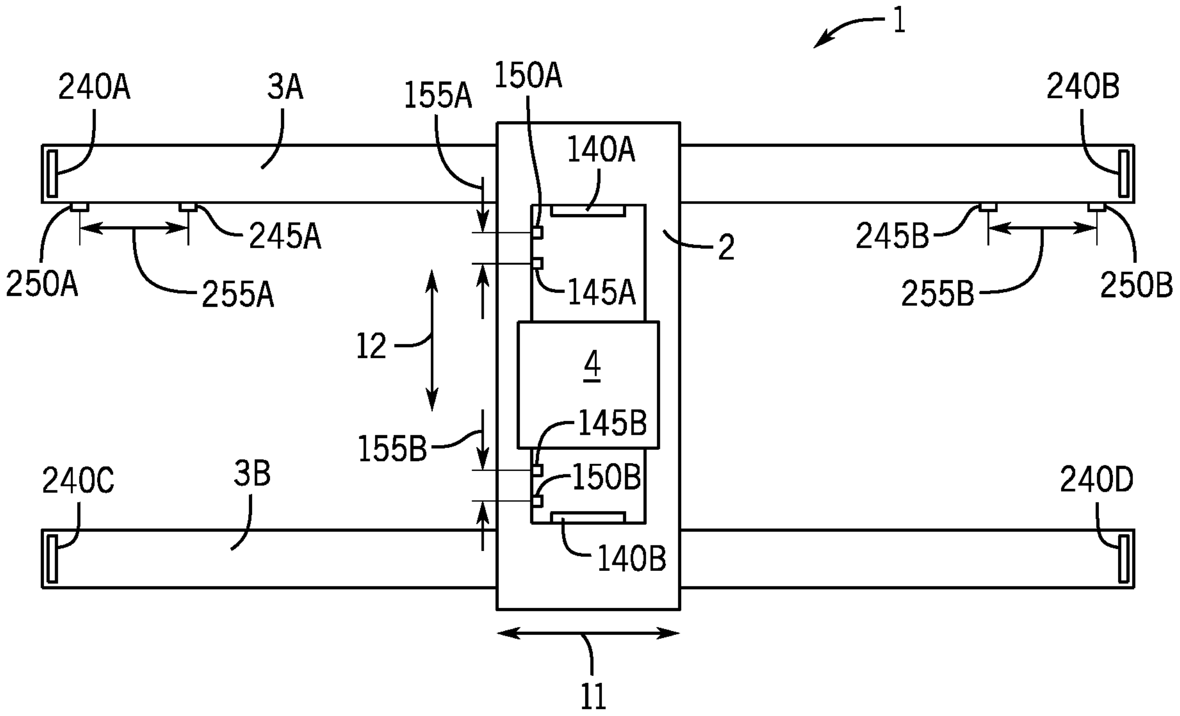
FIG. 6 is a top plan view of a trolley mounted on a bridge which is, in turn, mounted on rails for an overhead material handling system.

With reference next to FIG. 6, an overhead crane is shown with a bridge 2 configured to move in a first axis of motion 11 along two rails 3. At each end of a rail 3, there are physical stops 240 mounted. The first rail 3A includes a first stop 240A mounted at a first end of the first rail and a second stop 240B mounted at a second end of the first rail. Similarly, the second rail 3B includes a first stop 240C mounted at a first end of the second rail and a second stop 240D mounted at a second end of the second rail. Each stop 240 extends upward from the rail 3 and is configured to prevent the bridge 2 from travelling off either end of the rails 3. To avoid damage to the bridge 2 and/or the stops 240, it is preferable to keep the bridge 2 from impacting the stops 240. A first sensor 245 is located along the rail some distance from the stops 240, where the first sensor 245 is referred to herein as a slow-down sensor. A second sensor 250 is located along the rail closer to the stops 240 than the first sensor 245, where the second sensor 250 is referred to herein as an end-of-travel sensor. A distance 255 between the first sensor 245 and the second sensor 250 is referred to herein as a slow-down region. A first slow-down sensor 245A and a first end-of-travel sensor 250A are both illustrated at the first end of the first rail 3A. A second slow-down sensor 245B and a second end-of-travel sensor 250B are both illustrated at the second end of the first rail 3A. It is contemplated that redundant sensors may be mounted along the second rail 3B as well.

The length of the slow-down region for the bridge 2 is determined as a function of the application requirements. A large capacity material handling system 1 may be required to lift tens or hundreds of tons of load. Additionally, the material handling system may travel tens to hundreds of meters along the length of the rails 3 and span tens of meters between rails. The physical structure of the material handling system 1 is sized according to the capacity of the crane. The weight of the material handling system 1 itself may similarly be in the tens of tons to support the rated load. Further, it is often desirable to traverse the length of the rails 3 as quickly as may be safely accomplished in order to maximize production efficiency. Thus, a substantial combined weight of the material handling system and load may require a lengthy slow-down region in order to safely decelerate from maximum speed to slow speed. This slow-down region may span for several meters and, for example, up to fifteen to twenty meters in length. For efficiency purposes, one end of the rails 3 is often located near a loading/unloading position, requiring the material handling system 1 to frequently be operated within this slow-down region 255. Thus, it is desirable to be able to operate as efficiently as possible within the slow-down region.

The overhead crane shown in FIG. 6 also includes a trolley 4 configured to move along the bridge 2 in a second axis of motion 12. At each end of the bridge 2, there are physical stops 140 mounted. A first stop 140A is mounted at a first end of the bridge 2, and a second stop 140B is mounted at a second end of the bridge. Although illustrate ads a single stop 140 at each end of the bridge 2, it is contemplated that separate stops 140 may be mounted along each side of the bridge 2 in a manner similar to the stops 240 mounted on the rails 3. Each stop 140 on the bridge 2 is configured to prevent the trolley 4 travelling off or impacting a portion of either end of the bridge 2. To avoid damage to the trolley 4, bridge 2 and/or the stops 140, it is preferable to keep the trolley 4 from impacting the stops 140. A first sensor 145 is located along the bridge 2 some distance from the stops 140, where the first sensor 145 is referred to herein as a slow-down sensor. A second sensor 150 is located along the bridge 2 closer to the stops 140 than the first sensor 145, where the second sensor 150 is referred to herein as an end-of-travel sensor. A distance 155 between the first sensor 145 and the second sensor 150 is referred to herein as a slow-down region. A first slow-down sensor 145A and a first end-of-travel sensor 150A are both illustrated at the first end of the bridge 2. A second slow-down sensor 145B and a second end-of-travel sensor 150B are both illustrated at the second end of the bridge 2. It is contemplated that redundant sensors may be mounted along each side of the bridge 2 as well.

The length of the slow-down region for the trolley 4 is determined as a function of the application requirements. As discussed above with respect to the bridge 2, a large capacity material handling system 1 may be required to lift tens or hundreds of tons of load. The trolley 4 travels the span between rails 3 and must also be constructed according to the capacity of the crane. It is desirable to traverse the span between the rails 3 as quickly as may be safely accomplished in order to maximize production efficiency. Thus, a substantial combined weight of the trolley 4 and load may require a lengthy slow-down region in order to safely decelerate from maximum speed to slow speed. This slow-down region may again span for several meters. The trolley 4 may regularly be operated within this slow-down region 255. Thus, it is desirable to be able to operate as efficiently as possible within the slow-down region.

Each sensor (145, 150, 245, 250) mounted along the bridge 2 or rails 3 is configured to generate a feedback signal indicating the presence of the trolley 4 or bridge 2, respectively, by the sensor. The sensor may be a mechanical limit switch which is toggled when the trolley 4 or bridge 2 reaches the sensor. Optionally, the sensor may be a magnetic or optical, non-contact style sensor which detects the presence of the trolley 4 or bridge 2 next to the sensor. The feedback signal is provided to a controller used to control operation of the trolley 4 or bridge 2. According to one aspect of the invention, the controller may be a programmable logic controller (PLC) mounted in a control cabinet on the bridge 2. According to another aspect of the invention, the motor controller 40 may be configured to receive the feedback signals and control operation of the motors 20. For discussion herein, the motor controller 40 will be receiving the feedback signals and will perform the steps discussed below for controlling operation of the motor 20 connected to the motor controller 40.

Figure 8:
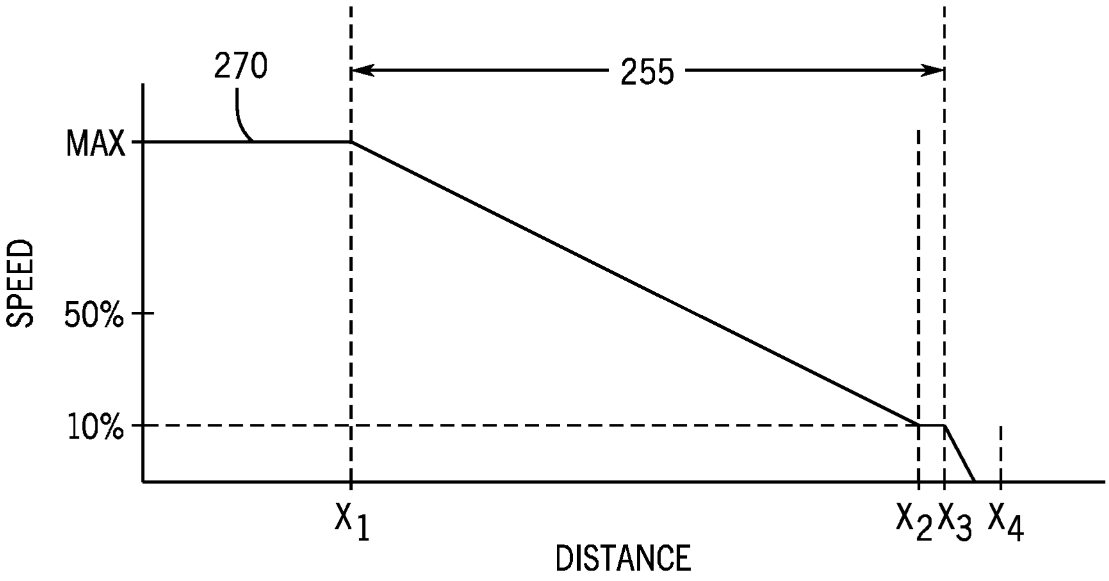
FIG. 8 is a graphical representation of a deceleration curve for the overhead material handling system of FIG. 6 with the bridge or trolley entering the slow down region at maximum speed.

The slow-down sensor 145, 245 is configured to generate a feedback signal indicating the controlled bridge 2 or trolley 4 has entered the slow-down region 155, 255 in the corresponding axis of motion 11, 12. With reference to FIG. 8, operation of the bridge 2 or trolley 4 in the axis of motion 11, 12 is illustrated when the bridge 2 or trolley 4 enters the slow down region travelling at maximum speed. For convenience, the bridge 2 or trolley 4 travelling along its respective axis of motion 11, 12 may be referred to herein as a controlled axis of motion. The plot 270 of speed with respect to distance travelled shows the axis of motion travelling for some time at maximum speed between the y-axis of the graph and the point labelled, $X_1$, along the x-axis of the graph. The point labelled, $X_1$, corresponds to the location at which the slow-down sensor 145, 245 is mounted. When the motor controller 40 receives the feedback signal indicating the controlled axis has entered the slow-down region, the motor controller 40 begins decelerating from maximum speed to a slow speed of operation. The slow speed may be defined in a parameter 82 and stored in the memory 52 of the motor controller. The slow speed is user definable and configured according to the application requirements. According to the illustrated embodiment, the slow speed is ten percent (10%) of the maximum speed. A deceleration rate is defined such that the motor controller 40 decelerates from maximum speed to slow speed by the second point, $X_2$, as labelled along the x-axis. The deceleration rate and/or the location, $X_1$, of the first sensor is arranged such that the second point, $X_2$, is located in front of the location, $X_3$, for the end-of-travel sensor.

If the axis of motion 11, 12 continues travelling in the same direction as when it entered the slow-down region 255, it will reach the end-of-travel sensor 150, 250. A feedback signal from the end-of-travel sensor 150, 250 causes the motor controller 40 to bring the motor 20 to a stop. Because the axis of motion 11, 12 was previously decelerated to the slow speed of operation, the axis of motion may be rapidly brought to a stop over a short distance without damage. Stopping may occur by disabling the switching signals 62 within the motor controller and commanding the braking unit 30 to set the brake. The axis of motion 11, 12 comes to a complete stop prior to the fourth point, $X_4$, shown along the x-axis in FIG. 8, which corresponds to the location of the physical stop 140, 240 at the end of travel.

Figure 7:
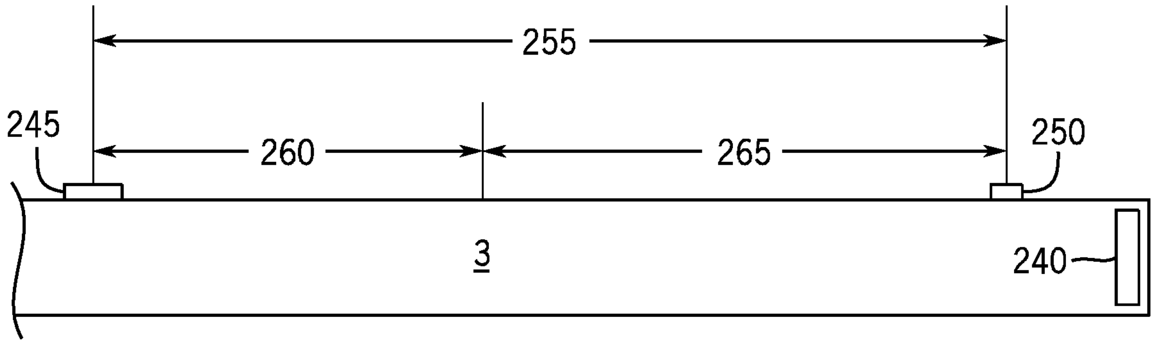
FIG. 7 is a partial top plan view of one rail of the overhead material handling system illustrated in FIG. 6.
Figure 9:
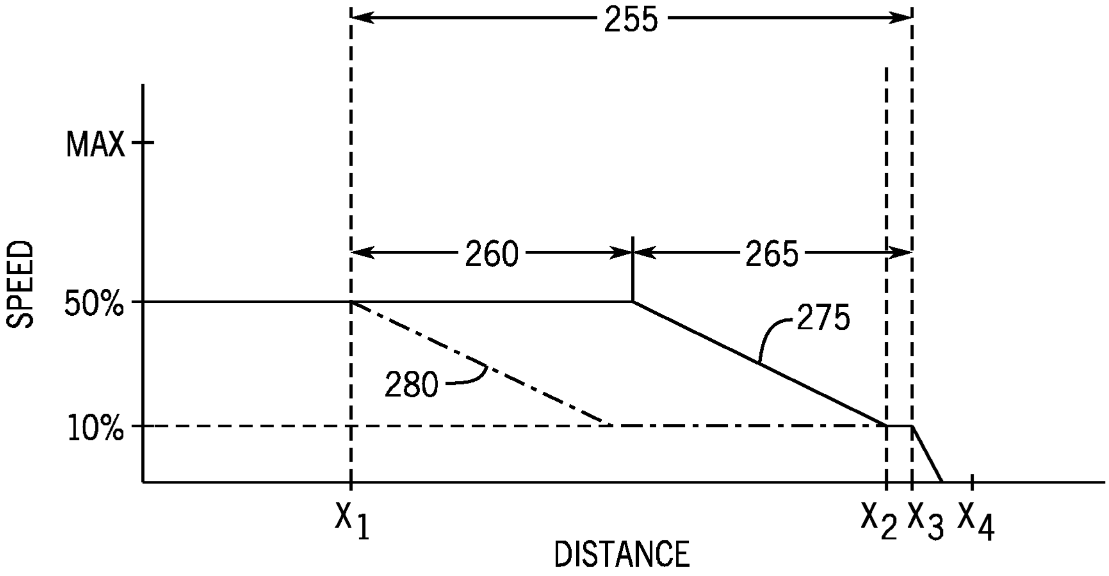
FIG. 9 is a graphical representation of a deceleration curve for the overhead material handling system of FIG. 6 with the bridge or trolley entering the slow down region at one-half of maximum speed.

With reference next to FIGS. 7 and 9, operation of the controlled axis is discussed when the motor 20 is operating at less than maximum speed when it reaches the slow-down sensor 145, 245. According to the illustrated embodiment, the motor controller 40 is controlling the motor 20 to run at fifty percent (50%) speed toward the end-of-travel. If the motor controller 40 were to immediately begin deceleration when it receives the feedback signal from the slow-down sensor, operation would proceed as illustrated by plot 280 in FIG. 9. The motor controller 40 is configured to decelerate at a rate sufficient to bring the controlled axis down to slow speed by the second point, $X_2$, as previously discussed. However, because the motor 20 was only running at fifty percent speed, it reaches the slow speed in less distance than required to decelerate from full speed. If the operator wishes to bring the trolley 4 or bridge 2 to the end of travel, the axis must travel the remaining distance at slow speed. Such operation can be undesirable and require an increased operation time when the overhead crane 1 requires operation near the end of travel limits.

In contrast, the motor controller 40 operating according to the present invention controls the motor 20 to operate according to plot 275 shown in FIG. 9. When the motor controller 40 receives the feedback signal from the slow-down sensor 145, 245, the motor controller determines a present speed of travel for the controlled axis of motion. The speed may be determined using, for example, the speed feedback signal 104 determined in the control module 100. Based on the present speed of travel and a desired deceleration rate, the motor controller 40 determines a slow-down distance 265 for the axis of motion. The slow-down distance 265 will be less than the full slow-down region 255 when the speed is less than maximum speed. The difference between the length of the slow-down region 255 and the slow-down distance 265 is a traverse distance 260. As shown in FIG. 9, the axis of motion 11, 12 may continue travelling at the 50% speed at which it entered the slow-down region 255 for the length of the traverse distance 260. After travelling for the traverse distance 260, the motor controller 40 begins decelerating the motor 20 to the desired slow speed. As a result, the motor 20 reaches the slow speed at the second point, $X_2$, identified along the x-axis in FIG. 9 in the same manner as it reaches the second point, $X_2$, identified along the x-axis in FIG. 8 when entering the slow-down region 255 at full speed. The axis of motion 11, 12 will only need to travel at slow speed for the short distance between the second point, $X_2$, and the third point, $X_3$, to reach the end of travel.

According to another aspect of the invention, the motor controller 40 may be configured to dynamically determine the traverse distance 260 and the slow-down distance 265 while the axis of motion 11, 12 is located within the slow-down region 155, 255. The motor controller 40 monitors the feedback signal from the first sensor 145, 245. When the first sensor generates a first signal indicating the axis of motion 11, 12 is proximate the sensor, the motor controller 40 may set an internal status bit indicating the axis of motion 11, 12 is located within a slow-down region 155, 255. When the first sensor generates a second signal indicating the axis of motion 11, 12 is proximate the sensor, the motor controller 40 may reset the internal status bit indicating the axis of motion 11, 12 has left the slow-down region 155, 255. While the internal status bit in the motor controller 40 indicates the axis of motion 11, 12 is within the slow-down region 155, 255 it may periodically determine the speed at which the axis is travelling.

While an axis of motion 11, 12 is located in the slow-down region 155, the motor controller 40 recalculates the traverse distance 260 and slow-down distance 265 based on the current speed of travel and the deceleration rate. The above-discussion of the slow-down region assumed a constant speed and direction of travel being commanded while located within the slow-down region 155, 255 with the motor controller 40 configured to automatically slow the motor 20 from the commanded speed to slow speed. However, an operator may change the speed command during operation within the slow-down region 155, 255. During one run, for example, the axis of motion 11, 12 may have been positioned just outside the slow-down region prior to starting operation. The axis of motion 11, 12 may then need to travel into the slow-down region. The operator may want to bring the trolley 4 or bridge 2 up to one-quarter or one-half of rated speed but the trolley or bridge will be travelling at a slower speed and still accelerating up to the desired speed when it enters the slow-down region. Initially, the slow-down distance 265 and traverse distance 260 would be calculated based on the speed at which the trolley or bridge entered the slow-down region 155, 255. However, as the axis of motion 11, 12 continues to accelerate, it will require a longer slow-down region 155, 255 than the distance originally calculated. Similarly, an operator may already be manually slowing a trolley 4 or bridge 2 from maximum speed to a slower speed as they enter the slow-down region 155, 255. The axis of motion 11, 12 may enter the slow-down region, for example, at seventy percent of rated speed and a first slow-down distance 265 and traverse distance 260 would be calculated based on this speed at which the trolley or bridge entered the slow-down region 155, 255. The operator, however, manually brings the axis of motion 11, 12 to one-half or one-quarter speed. If the slow-down distance 265 is not recalculated, the motor controller 40 will start decelerating the axis of motion 11, 12 sooner than necessary to reach the slow speed at the second point, $X_2$, along the x-axis. Thus, the motor controller 40 periodically determines new values of the slow-down distance 265 and the traverse distance 260 according to the current speed at which the motor 20 is being controlled while the axis of motion 11, 12 is located within the slow-down region 155, 255. This periodic update allows the motor controller 40 to begin deceleration to slow speed at the proper time based on the current speed of travel rather than starting either too early or to late based on the speed of travel when the trolley 4 or bridge 2 entered the slow-down region 155, 255.

According to still another aspect of the invention, the motor controller 40 may be configured to dynamically determine a maximum speed at which the axis of motion 11, 12 may travel while located within the slow-down region 255. With reference again to FIG. 8, the velocity profile between points $X_1$ and $X_2$ correspond to a maximum speed at which the axis of motion 11, 12 should travel toward the end-of-travel at any given distance between the two points. The motor controller 40 may maintain a record of distance travelled once the trolley 4 or bridge 2 has entered the slow-down region 255 such that the motor controller 40 has knowledge of the position between points $X_1$ and $X_2$ at which the trolley or bridge is located. If the trolley 4 or bridge 2 is commanded to move away from the end of travel, then the respective axis of motion is allowed to travel up to maximum speed. If, however, the trolley 4 or bridge 2 is commanded to move toward the end of travel, it would need to begin decelerating when the speed at which it is traveling intersects the deceleration curve shown in FIG. 8. The motor controller 40 may determine a maximum speed at which the axis of motion 11, 12 may travel as a function of its present location and of the deceleration rate stored in the memory 52. Therefore, by setting a maximum speed at which the axis of motion 11, 12 is allowed to travel equal to the speed indicated by the deceleration curve as a function of the current position for the axis of motion, the motor controller 40 will decelerate the axis as it travels between points $X_1$ and $X_2$.

According to another aspect of the invention, the motor controller 40 may use a position feedback signal from the position sensor 24 to track the present location of the axis of motion 11, 12 within the slow-down region 155, 255. The position sensor 24 is connected to the motor 20 and provides a feedback signal corresponding to an angular position of the motor 20. A parameter 82 stored in memory 52 may identify a distance of travel for the axis as a function of one rotation or of a number of counts from the position feedback signal. The parameter 82 may be set during commissioning and account for gear ratios in a gearbox, diameter of a drive wheel, and other such factors that translate the angular position of the motor to linear travel along the respective axis of motion 11, 12. Optionally, the motor controller 40 may use the position feedback signal directly. Rather than determining a conversion factor between the angular position of the motor to linear travel of the axis of motion 11, 12, a parameter 82 may store a value of the number of motor rotations required for the corresponding axis to travel between points $X_1$ and $X_2$. As the bridge 2 or trolley 4 is commanded to move, the motor controller 40 maintains a running total of the number of rotations the motor 20 has rotated in order to track the present location of the respective axis of motion 11, 12 between points $X_1$ and $X_2$.

According to still another aspect of the invention, the motor controller 40 may be configured to track the position of the bridge 2 or trolley 4 when the bridge or trolley has no position feedback signal. Operation without a position feedback signal is referred to as open loop position control. During open loop position control, a command is provided to the motor 20 corresponding to a desired operation of the motor 20 and of the axis of motion controlled by the motor. The motor controller generates a feasible command signal, such that there is an expectation that the commanded axis of motion is able to follow the command signal. Consequently, the motor controller 40 may use the motor command signal to track the number of rotations of the motor 20. When the bridge 2 or trolley 4 is present in the slow-down region 255, 155, the motor controller tracks the number of rotations commanded and determines the location of the controlled axis of motion between points $X_1$ and $X_2$.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for dynamically controlling operation in a slow-down region for a material handling system, the system comprising:

at least one motor operatively connected to the material handling system to drive motion of an axis of motion for the material handling system;

at least one motor controller operatively connected to control operation of the at least one motor; and a sensor configured to generate a feedback signal corresponding to a start of the slow-down region along the axis of motion, wherein:

the slow-down region has a first length, the feedback signal is provided to the at least one motor controller, and the at least one motor controller is operative to:

determine a present velocity of the axis of motion, determine a slow-down distance for the axis of motion as a function of the present velocity and a deceleration rate, determine a traverse distance for the axis of motion as a difference between the first length and the slow-down distance, keep the present velocity of the axis of motion at a commanded velocity when the axis of motion is within the traverse distance, and decelerate the axis of motion when the axis of motion enters the slow-down distance.

2. The system of claim 1, wherein the at least one motor controller is further operative to determine the present velocity and the slow-down distance for the axis of motion when the feedback signal is generated by the sensor.

3. The system of claim 1, wherein the at least one motor controller is further operative to:

track a current position of the axis of motion, periodically determine the present velocity, the slow-down distance, and the traverse distance while the current position of the axis of motion is within the slow-down region.

4. The system of claim 3, wherein the at least one motor controller is further operative to:

periodically determine a maximum speed for the axis of motion as a function of the current position and the deceleration rate while the axis of motion is in the slow-down region, keep the present velocity of the axis of motion at the commanded velocity when the present velocity of the axis of motion is less than the maximum speed, and decelerate the axis of motion when the present velocity of the axis of motion is equal to or greater than the maximum speed.

5. The system of claim 1, wherein the at least one motor controller is further operative to:

detect a direction of travel for the axis of motion, decelerate the axis of motion when the axis of motion is travelling toward an end-of-travel and the axis of motion enters the slow-down distance, and permit the axis of motion to travel up to a maximum speed when the axis of motion is travelling away from the end-of-travel and the axis of motion is in the slow-down distance.

6. The system of claim 1, wherein the at least one motor controller is further operative to:

monitor a motor command to determine a number of revolutions of the motor, determine a present location of the axis of motion as a function of the number of revolutions of the motor, and determine whether the axis of motion is within the traverse distance or the slow-down distance as a function of the present location.

7. The system of claim 1, further comprising a position feedback device configured to generate a position feedback signal, corresponding to an angular position of the at least one motor, wherein the at least one motor controller is further operative to:

determine a present location of the axis of motion as a function of the position feedback signal, and determine whether the axis of motion is within the traverse distance or the slow-down distance as a function of the present location.

8. A method for dynamically controlling operation in a slow-down region for a material handling system, the method comprising the steps of:

receiving a feedback signal from a sensor at a motor controller, wherein:

the feedback signal corresponds to a start of the slow-down region, and the motor controller is operatively connected to control operation of a motor for an axis of motion in the material handling system;

determining a present velocity of the axis of motion with the motor controller;

determining a slow-down distance for the axis of motion with the motor controller as a function of the present velocity and a deceleration rate;

determining a traverse distance for the axis of motion with the motor controller as a difference between a length of the slow-down region and the slow-down distance;

maintaining a commanded velocity for the axis of motion with the motor controller when the axis of motion is within the traverse distance; and decelerating the axis of motion with the motor controller when the axis of motion enters the slow-down distance.

9. The method of claim 8, wherein determining the present velocity and the slow-down distance for the axis of motion occur responsive to receiving the feedback signal.

10. The method of claim 8, further comprising the steps of:

tracking a current position of the axis of motion with the motor controller; and periodically determining the present velocity, the slow-down distance, and the traverse distance while the current position of the axis of motion is within the slow-down region.

11. The method of claim 10, further comprising the steps of:

periodically determining a maximum speed for the axis of motion with the motor controller as a function of the current position and the deceleration rate while the axis of motion is in the slow-down region, keep the present velocity of the axis of motion at the commanded velocity when the present velocity of the axis of motion is less than the maximum speed, and decelerate the axis of motion when the present velocity of the axis of motion is equal to or greater than the maximum speed.

12. The method of claim 8 further comprising the steps of:

detecting a direction of travel for the axis of motion with the motor controller;

decelerating the axis of motion occurs when the axis of motion is travelling toward an end-of-travel and the axis of motion enters the slow-down distance; and permitting the axis of motion to travel up to a maximum speed when the axis of motion is travelling away from the end-of-travel and the axis of motion is in the slow-down distance.

13. The method of claim 8 further comprising the steps of:

monitoring a motor command with the motor controller to determine a number of revolutions of the motor;

determining a present location of the axis of motion with the motor controller as a function of the number of revolutions of the motor; and determining whether the axis of motion is within the traverse distance or the slow-down distance as a function of the present location.

14. The method of claim 8 further comprising the steps of:

receiving a position feedback signal from a position feedback device at the motor controller, wherein the position feedback signal corresponds to an angular position of the motor;

determining a present location of the axis of motion with the motor controller as a function of the position feedback signal; and determining whether the axis of motion is within the traverse distance or the slow-down distance as a function of the present location.

15. A method for dynamically controlling operation in a slow-down region for a material handling system, the method comprising the steps of:

determining a distance of a bridge or a trolley to travel between a slow-down sensor and a desired position for a slow-down speed;

receiving a feedback signal from the slow-down sensor at a motor controller for the bridge or trolley;

determining a slow-down distance for the bridge or trolley to reach the desired position for the slow-down speed after receiving the feedback signal from the slow-down sensor;

continuing motion of the bridge or trolley without decelerating for at least a portion of the distance between the slow-down sensor and the desired position for the slow-down speed; and decelerating the bridge or trolley with the motor controller when the bridge or trolley enters the slow-down distance.

16. The method of claim 15 wherein the distance is a number of rotations of a motor, wherein the motor is operatively connected to the motor controller to move the bridge or trolley.

17. The method of claim 15 further comprising the step of determining a present velocity of a motor operatively connected to the motor controller when the motor controller receives the feedback signal, wherein the slow-down distance is determined as a function of the present velocity of the motor.

18. The method of claim 17, wherein the motor controller determines the present velocity of the motor as a function of a commanded speed for the motor.

19. The method of claim 17 further comprising the step of receiving a position feedback signal from a position feedback device operatively connected to the motor, wherein the motor controller determines the present velocity of the motor as a function of the position feedback signal.

20. The method of claim 15 further comprising the steps of:

tracking a current position of the bridge or trolley with the motor controller; and periodically determining the slow-down distance for the bridge or trolley while the current position is within the slow-down region.

* * * * *